(12) United States Patent
Baarz et al.

(10) Patent No.: US 9,582,161 B2
(45) Date of Patent: Feb. 28, 2017

(54) CONFIGURABLE ANIMATED SCATTER PLOTS

(71) Applicant: Adobe Systems Incorporated, San Jose, CA (US)

(72) Inventors: Ryan S. Baarz, Provo, UT (US); Cameron R. Cowan, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 243 days.

(21) Appl. No.: 14/016,014

(22) Filed: Aug. 30, 2013

(65) Prior Publication Data

US 2015/0067566 A1 Mar. 5, 2015

(51) Int. Cl.
| | |
|---|---|
| *G06F 3/00* | (2006.01) |
| *G06F 3/0484* | (2013.01) |
| *G06F 17/30* | (2006.01) |
| *G06T 11/20* | (2006.01) |

(52) U.S. Cl.
CPC .... *G06F 3/04842* (2013.01); *G06F 17/30572* (2013.01); *G06F 2203/04806* (2013.01); *G06T 11/206* (2013.01)

(58) Field of Classification Search
CPC .......... G06F 17/20; G06F 2203/04806; G06F 3/04842; G06F 3/0488
See application file for complete search history.

(56) References Cited

U.S. PATENT DOCUMENTS

| | | | | |
|---|---|---|---|---|
| 8,612,864 B2* | 12/2013 | Moyne | .................. | G06F 3/0481 345/440 |
| 2003/0065546 A1* | 4/2003 | Gorur | .................... | G06Q 10/06 705/7.17 |
| 2007/0225986 A1* | 9/2007 | Bowe, Jr. | ............. | G06Q 30/012 705/1.1 |
| 2010/0103176 A1* | 4/2010 | Hao | .................... | G01N 15/1475 345/440 |
| 2010/0231594 A1* | 9/2010 | Hao | .................. | G06F 17/30572 345/440 |

(Continued)

OTHER PUBLICATIONS

Craig et al., Coordinated Graph and Scatter-Plot Views for the visual Exploration of Microarray Time Series Data; © 2003; IEEE; 8 pages.*

(Continued)

*Primary Examiner* — Linh K Pham
(74) *Attorney, Agent, or Firm* — Wolfe-SBMC

(57) ABSTRACT

In embodiments of configurable animated scatter plots, a data visualization interface includes a charting region to display data points in a scatter plot format. A scatter plot application is implemented to receive a request to display the data visualization interface at a client device, and initiate a display of the data points in a scatter plot in the charting region of the data visualization interface at the client device. The scatter plot application is implemented to then recursively update the display of the data points based on sequential data for each of the data points effective to animate a progression of the data points in the scatter plot over a time duration. The next sequential data is obtained for each of the data points and the display of each of the data points in the scatter plot is updated at a respective position based on the next sequential data.

20 Claims, 6 Drawing Sheets

(56) References Cited

U.S. PATENT DOCUMENTS

| | | | | |
|---|---|---|---|---|
| 2011/0029926 A1* | 2/2011 | Hao | ................... | G06F 17/30722 |
| | | | | 715/835 |
| 2012/0005045 A1* | 1/2012 | Baker | ................. | G06Q 30/0643 |
| | | | | 705/27.2 |
| 2012/0271748 A1* | 10/2012 | DiSalvo | ................. | G06Q 40/04 |
| | | | | 705/37 |
| 2013/0050232 A1* | 2/2013 | Hao et al. | ...................... | 345/589 |
| 2013/0147834 A1* | 6/2013 | Yoshimoto | ............ | G01C 21/367 |
| | | | | 345/629 |
| 2014/0282124 A1* | 9/2014 | Grealish | .................. | G06F 3/048 |
| | | | | 715/762 |
| 2015/0040047 A1* | 2/2015 | Baarz | ................. | G06F 17/30994 |
| | | | | 715/769 |
| 2015/0067566 A1* | 3/2015 | Baarz | .................. | G06F 3/04842 |
| | | | | 715/771 |
| 2015/0131887 A1* | 5/2015 | Racine | ................. | G06K 9/6267 |
| | | | | 382/133 |

OTHER PUBLICATIONS

Sadana et al; Designing and Implementing an Interactive Scatterplot Visualization for a Tablet Computer; © 2014; ACM; 8 pages.*
Saket et al.; Visualization by Demonstration: An Interaction Paradigm for Visual Data Exploration; © 2006; IEEE; 10 pages.*
Craig et al_2005; Coordinated Parallel Views for the Exploratory Analysis of Microarray Time-course Data; © 2005; IEEE; 12 pages.*

* cited by examiner

CONFIGURABLE ANIMATED SCATTER PLOTS

BACKGROUND

A scatter plot can be utilized to identify correlations between metrics, or data variables, such as one variable plotted along a horizontal axis of a scatter plot and a second variable plotted along a vertical axis of the scatter plot. However, scatter plots typically only offer a static view of data points that correlate the variables at a particular time. Scatter plots do not provide an insight as to how the variables that correlate to the data points in a scatter plot may change over time, and it can be difficult to discern why the data points in a scatter plot change. It is particularly inconvenient and tedious to compare hundreds of pages of data points attempting to determine changing variables and the effects on the data points in static scatter plots.

SUMMARY

This Summary introduces features and concepts of configurable animated scatter plots, which is further described below in the Detailed Description and/or shown in the Figures. This Summary should not be considered to describe essential features of the claimed subject matter, nor used to determine or limit the scope of the claimed subject matter.

Configurable animated scatter plots are described. In embodiments, a data visualization interface includes a charting region to display data points in a scatter plot format. A scatter plot application can receive a request to display the data visualization interface at a client device, and initiate a display of the data points in a scatter plot in the charting region of the data visualization interface at the client device. The scatter plot application is implemented to then recursively update the display of the data points based on sequential data for each of the data points effective to animate a progression of the data points in the scatter plot over a time duration. The next sequential data is obtained for each of the data points and the display of each of the data points in the scatter plot is updated at a respective position based on the next sequential data.

In implementations, the sequential data for each of the data points includes a list of (x,y) coordinates, and each (x,y) coordinate identifies the respective position of a data point in the scatter plot at a particular time within the time duration. Additionally, each data point represents values for two variables that are correlated by the scatter plot, and the respective position of the data point in the scatter plot illustrates the correlation of the two variables at a particular time within the time duration over which the scatter plot is represented. The scatter plot application can also receive a user selection of one or more of the data points that are displayed in the scatter plot, and then initiate a display update to change a visual representation of the selected data points. A user selection may be received to tag the selected data points for tracking over the time duration, received to update a data variable of the one or more selected data points and/or, received as a zoom input of the scatter plot to zoom the display of the selected data points.

BRIEF DESCRIPTION OF THE DRAWINGS

Embodiments of configurable animated scatter plots are described with reference to the following Figures. The same numbers may be used throughout to reference like features and components that are shown in the Figures.

DETAILED DESCRIPTION

Embodiments of configurable animated scatter plots are described, which enables a user to view data points as they change over time in an animated scatter plot. The data points update and display as an animated visual representation in a scatter plot to show changes in the data points over a time duration, such as hours, days, weeks, months, or any other designated duration. The data points are also selectable for user interaction, and a user can tag selected data points to track the data points and changes over the time duration. The user can also update data variables of selected data points and track the effects of changes to the data points over the time duration. For example, a user may select data points in a scatter plot that correlates an advertisement variable with a revenue variable over a thirty day period, and increase the advertising budget associated with the selected data points. The user can then track the marketing performance of the selected data points over the thirty days and attribute changes in revenue to the advertising budget increase.

In implementations, embodiments of configurable animated scatter plots are applicable for marketing analysis, search advertising, display advertising, social marketing, and any other type of campaign advertising so that a user can analyze advertising data and information in an animated scatter plot format. Further, a user can utilize any tracked metrics or types of data variables to configure a scatter plot so as to compare and determine selected data variable changes over time.

While features and concepts of configurable animated scatter plots can be implemented in any number of different devices, systems, networks, environments, and/or configurations, embodiments of configurable animated scatter plots are described in the context of the following example devices, systems, and methods.

Figure 1:
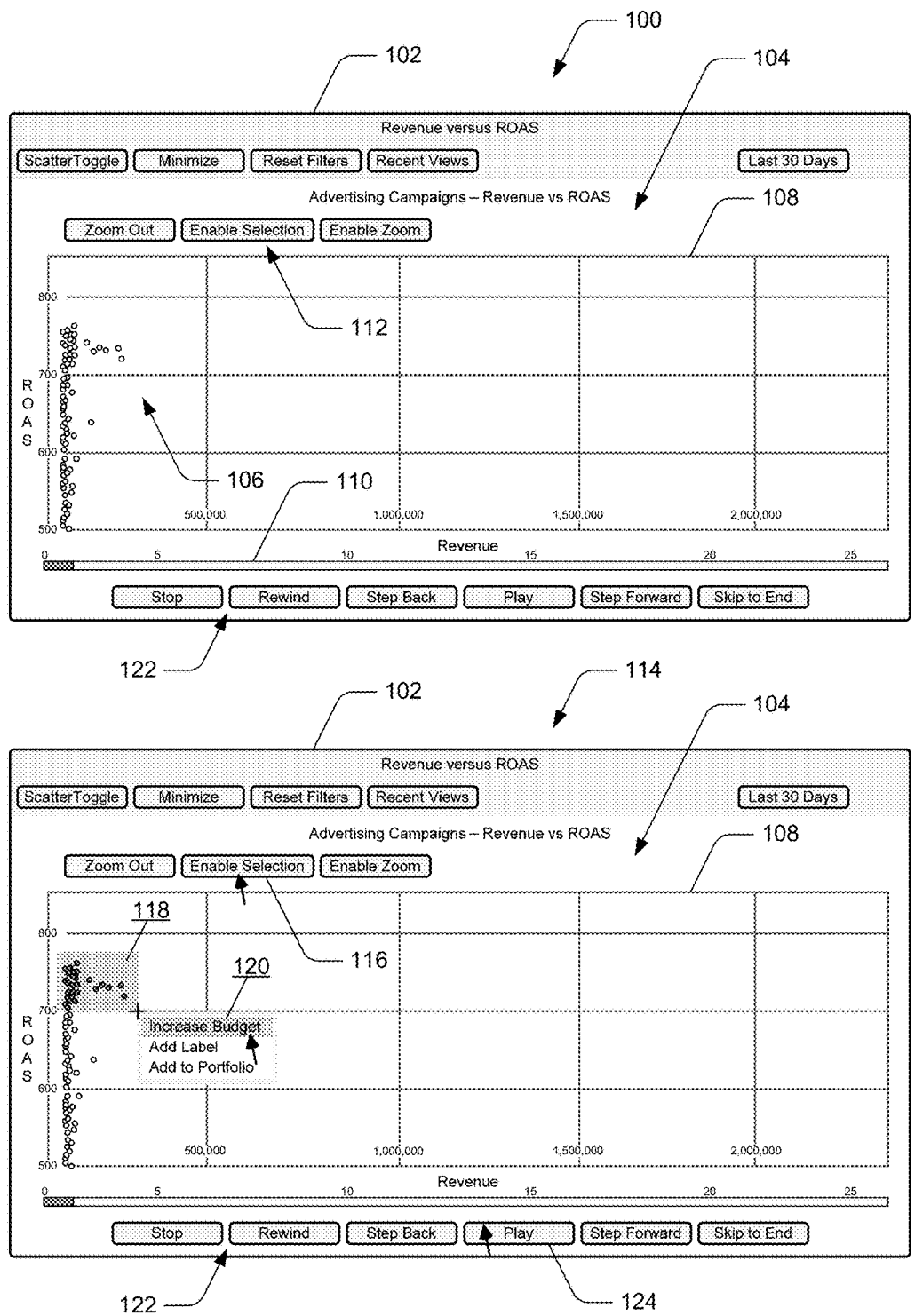
FIG. 1 illustrates an example data visualization interface in accordance with one or more embodiments of configurable animated scatter plots.

FIG. 1 illustrates an example 100 of a data visualization interface 102 in embodiments of configurable animated scatter plots. The data visualization interface 102 may also be referred to as an interactive data visualization dashboard that displays data, or segments of the data, in various formats. In this example, the data visualization interface 102 includes a charting region 104 that is implemented to display a graphical representation of selected data points 106 in a scatter plot format. The charting region is shown displaying the data points in a scatter plot 108 that correlates data variables for revenue (on the horizontal axis) versus the return on advertisement spend (on the vertical axis). The charting region 104 can display any type of configurable animated scatter plots, or other types of data visualizations, and the data points 106 represent values for the two variables that are correlated by the scatter plot over a time duration.

The respective position of a data point 106 in the scatter plot 108 illustrates the correlation of the two variables at a particular time within a time duration 110, denoted as frames or segments of the time duration. The time duration 110 of an animated scatter plot may be segmented into hours, days, weeks, months, or any other designated frames or segments of the time duration. In this example scatter plot 108, the frames of the time duration represent days, such as the last thirty days over which the data variables of the data points 106 are correlated and displayed.

The data visualization interface 102 includes selectable controls 112, such as to enable a zoom mode, zoom out, and to enable a selection mode. For example, as shown at 114, a user can select the "enable selection" selectable control 116 to initiate a selection 118 of one or more data points 106 that are displayed in the scatter plot 108. A user selection of data points may be received to tag the selected data points for tracking over the time duration 110 and/or may be received to update a data variable of the one or more selected data points. In this example, the selected data points are illustrated as the darker, filled-in data points. The data points can be selected by dragging a boundary around the group of selected data points and in implementations, a user can select the selectable controls 112 and/or the selection 118 of the data points with a computer input device, such as a computer mouse device or any other type of input device. A user may also initiate the selections in the data visualization interface as touch contacts and/or gestures on a touchscreen device.

The selection 118 of the data points can also initiate the display of additional actions 120 that are associated with the selected data points. A user may select any of the additional actions 120 to initiate an action and/or an update to the data variables of the data points. From the animated scatter plot 108 in the data visualization interface, a user can monitor and facilitate advertising campaign management, such as to change budgets, advertising bids, setup and receive alerts, and/or any other actions that are associated with the data variables that are represented by the data points in the scatter plot. In this example of the additional actions 120 that are associated with the selected data points 106, the user may add a label to one or more of the selected data points, add to the portfolio (e.g., an algorithm that manages or optimizes advertising) associated with the selected data points, and/or as shown in this example, increase the advertising budget for the selected data points.

Figure 2:
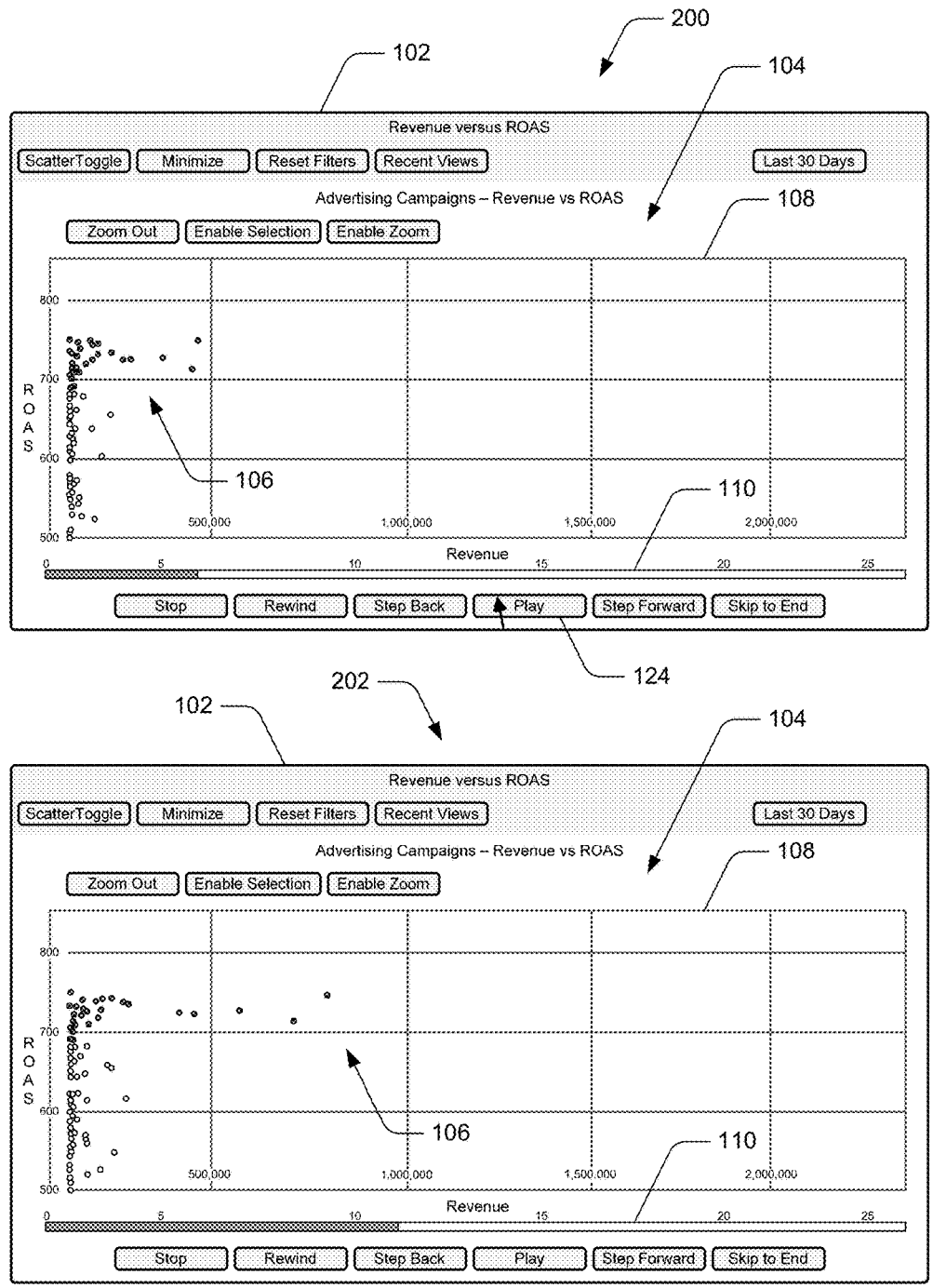
FIGS. 2 and 3 further illustrate the data visualization interface in embodiments of configurable animated scatter plots.
Figure 3:
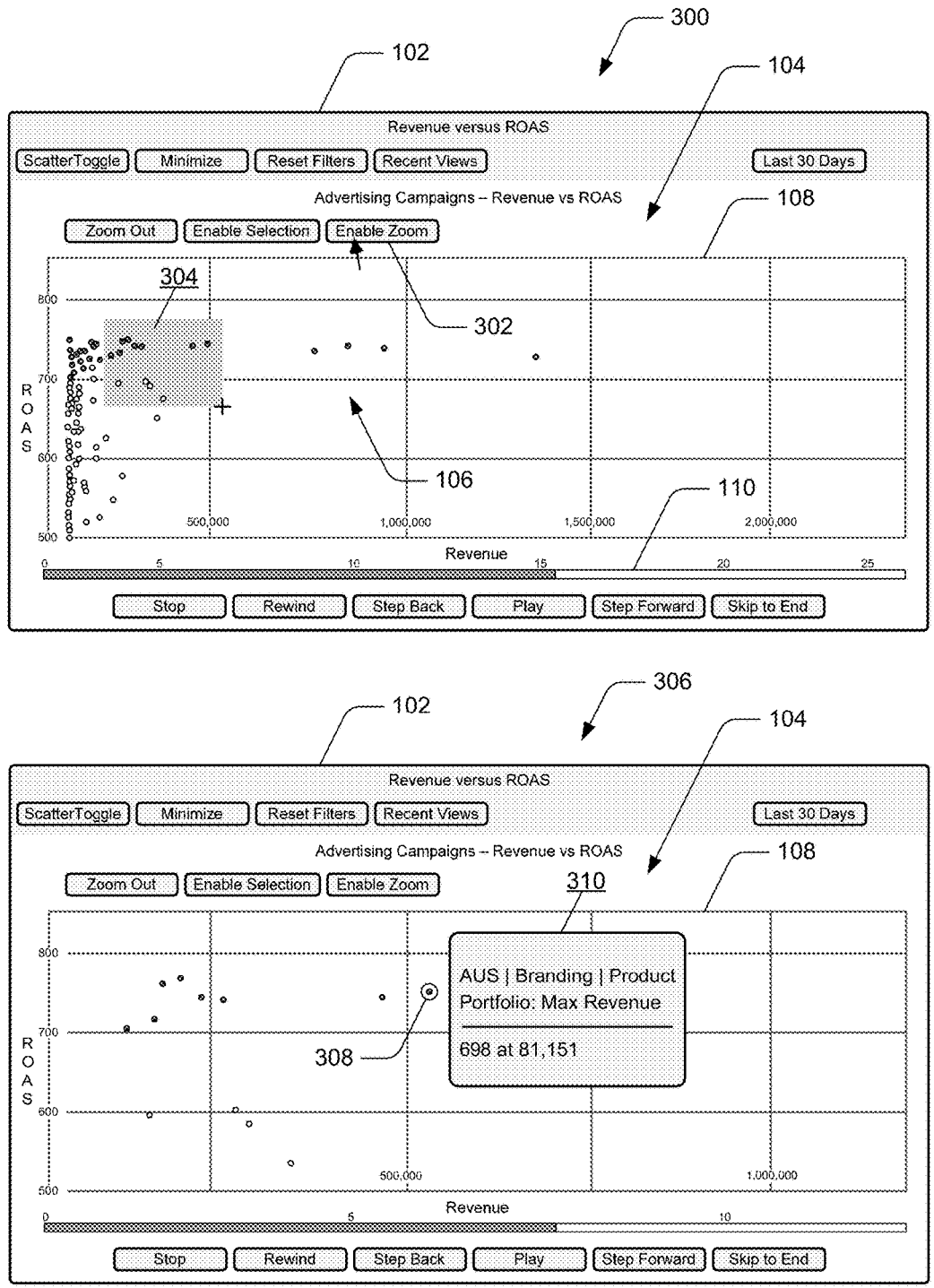

The data visualization interface 102 also includes selectable controls 122, such as to stop, rewind, and play the animated scatter plot 108, as well as to step back, step forward, and skip to the end of the animated scatter plot. For example, a user can select the "play" selectable control 124 to initiate an animation of the data points 106 that are displayed in the scatter plot 108, and the scatter plot advances over the time duration and displays the data points sequentially updated. FIGS. 2 and 3 further illustrate the progression of the data points animated over the time duration in the scatter plot.

FIGS. 2 and 3 illustrate respective examples 200 and 300 of the data visualization interface 102 in embodiments of configurable animated scatter plots. The examples 200 and 300 include the data visualization interface 102 and continue the example animation of the data points 106 in the scatter plot 108 when the user selects the "play" selectable control 124 to initiate the scatter plot advancing the animation of the data points 106 over the time duration 110 to display the data points sequentially updated. The animation of the scatter plot 108 continues, as shown at 202 (FIG. 2), as the data points 106 continue to update over the time duration. Similarly, the animation of the scatter plot 108 continues, as shown at 300 (FIG. 3), as the data points 106 continue to update over the time duration.

The data points 106 in the scatter plot 108 are serialized over the time duration 110, and a user can monitor the historical performance of the data points as the animated changes provide insight into why the data variable correlations change based on the additional context shown in the scatter plot. The animation of the scatter plot 108 shown in FIGS. 1-3 illustrates that the selected data points of the selection 118 (shown in FIG. 1) expand to the right over the time duration and show a greater increase in revenue based on the budget increase action 120 than data points that were not selected. In this example, the revenue increases for the data points that move to the right and the efficiency of the advertising spend also increases for the data points that move up in the scatter plot, as related to the revenue shown on the horizontal axis versus the return on advertisement spend shown on the vertical axis. Alternatively, a data point that moves to the right and down would illustrate an increase in revenue, but more being spent for advertising to realize the increased revenue.

In implementations of the configurable animated scatter plots, each data point 106 has an x and y coordinate that indicates the position of a data point in the scatter plot 108 for a particular frame, segment, or time. Each data point is recursively updated based on sequential (x,y) coordinate data as the animation of the data points progresses at respective positions in the scatter plot. The sequential (x,y) coordinate data for each of the data points is implemented as an array or list of (x,y) coordinates for each data point, and each (x,y) coordinate identifies the respective position of a data point in the scatter plot at a particular time within the time duration. For a scatter plot over a time duration of thirty days, the sequential data includes the (x,y) coordinate data for each data point in thirty different scatter plots that are then sequentially displayed effective to animate the display of the data points in the data visualization interface. Each of the data points can be displayed for a designated timeout, such as for one second, and then redisplayed at the next (x,y) coordinate based on the sequential data for each of the data points. The scatter plot is recursively updated through the sequential (x,y) coordinate data for each of the data points throughout the time duration for the scatter plot, or until the user initiates one of the selectable controls 122, such as to stop, rewind, or step back in the scatter plot.

In the data visualization interface 102, a user can select the "enable zoom" selectable control 302 to initiate a selection 304 of data points 106 to zoom into the scatter plot 108. The data points can be selected by dragging a boundary around the area of the scatter plot that a user wants to zoom into the scatter plot. As shown at 306, the scatter plot 108 is zoomed into the data visualization interface 102 to display the selection 304 of the data points. The example data visualization interface shown at 306 also illustrates that a user can select a data point 308 which initiates the display of a data label 310 that identifies the data point with any type of data, information, and/or client designated identifiers.

In embodiments of configurable animated scatter plots, a cloud-based data service provides an on-line, Web-based scatter plot application that a user can log into from a computing device and display the data visualization interface 102. The data service also maintains the data for each of the data points 106 that are displayed in the charting region 104 of the data visualization interface as a scatter plot. An example of an interactive data visualization system is described further with reference to FIG. 4.

Figure 4:
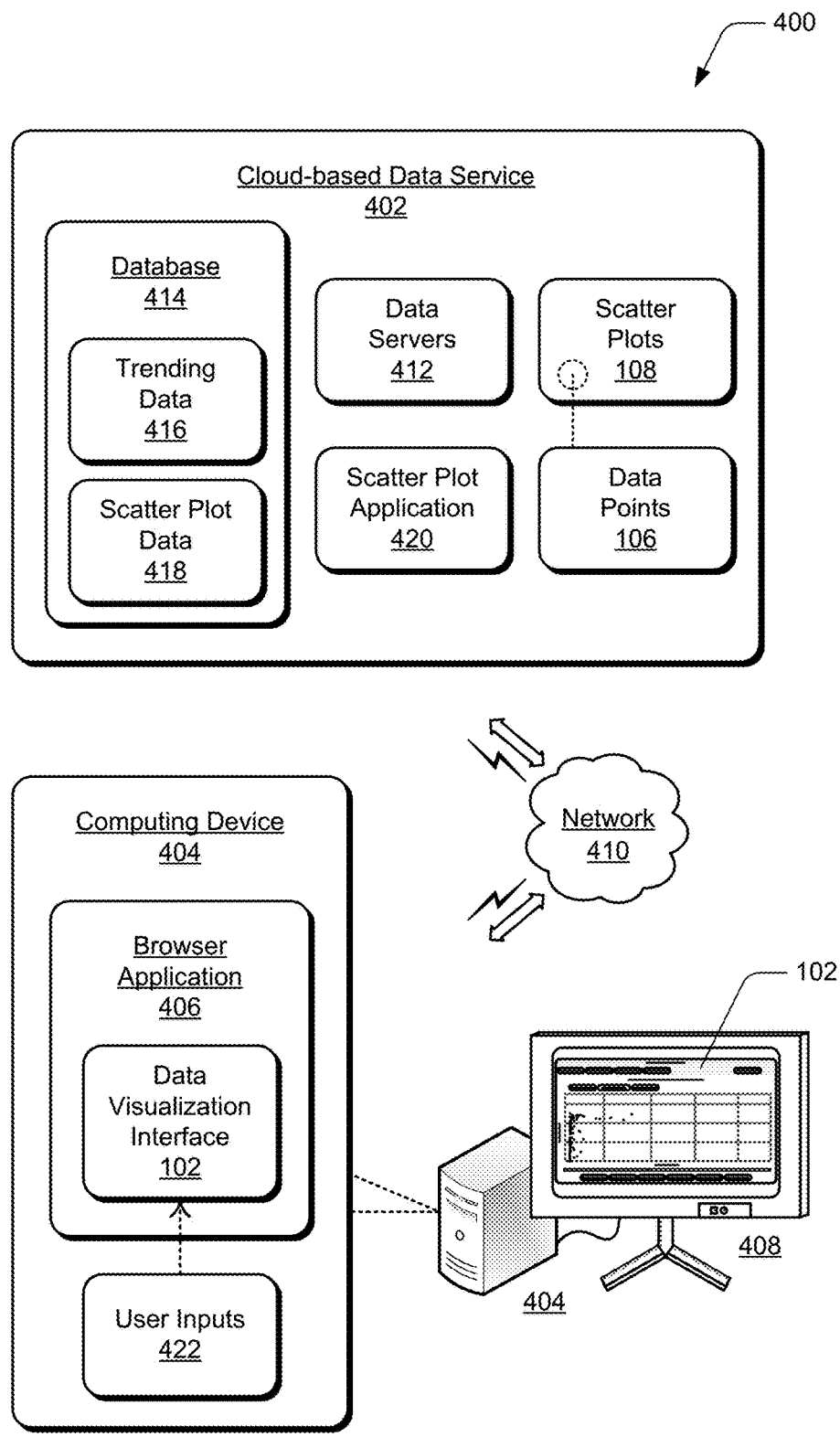
FIG. 4 illustrates an example system in which embodiments of configurable animated scatter plots can be implemented.

FIG. 4 illustrates an example system 400 in which embodiments of configurable animated scatter plots can be implemented. The example system 400 includes a cloud-based data service 402 that a user can access via a computing device 404, such as any type of computer, mobile phone, tablet device, and/or other type of computing device. The computing device 404 can be implemented with a browser application 406 through which a user can access the data service 402 and initiate a display of the data visualization interface 102 with an animated scatter plot, also shown on a display device 408 that is connected to the computing device. The computing device 404 can be implemented with various components, such as a processing system and memory, and with any number and combination of differing components as further described with reference to the example device shown in FIG. 6.

In an implementation, the cloud-based data service 402 is an example of a network service utilized by advertisers to facilitate managing and tracking data for advertising campaigns. An advertiser can input and store all of the advertising information and keywords used for advertising at the data service. The data service 402 can also receive reporting data from any one or more of the commonly used Internet search engines, as well as advertising campaign conversion data that is returned from tracking Websites. The advertising data and information is all collected and stored at the data service where it can then be accessed and analyzed, such as by an advertiser (e.g., a user) at the computing device 404 who analyzes the data, charts, graphs, and reports for marketing trends and any other type of analytics.

Any of the devices, data servers, and networked services described herein can communicate via a network 410, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 402 includes data servers 412 that may be implemented as any suitable memory, memory device, or electronic data storage for network-based data storage, and the data servers communicate data to computing devices via the network 410. The data servers 412 maintain a database 414 of trending data 416, such as any type of data and information associated with advertising campaigns, click-through conversions, and other tracked data that is collected and communicated to the data service. The database 414 also includes the scatter plot data 418, such as the sequential (x,y) coordinate data for each of the data points in arrays or lists of (x,y) coordinates that are associated with the correlated variables that each data point 106 represents in a scatter plot 108. The data service 402 maintains the data (e.g., the trending data 316, the scatter plot data 418, updated data, etc.) that is displayed in the charting region 104 of the data visualization interface 102, such as in animated scatter plots.

The cloud-based data service 402 includes a scatter plot application 420, such as a software application (e.g., executable instructions) that is executable with a processing system to implement embodiments of configurable animated scatter plots. The scatter plot application 420 can be stored on a computer-readable storage memory, such as any suitable memory, storage device, or electronic data storage implemented by the data servers 412. Further, the data service can include any server devices and applications, and can be implemented with various components, such as a processing system and memory, as well as with any number and combination of differing components as further described with reference to the example device shown in FIG. 6.

In embodiments, the scatter plot application 420 is implemented to receive a request to display the data visualization interface 102 at a client device, such as when a user at the computing device 404 initiates a user input 422 to access and display the data visualization interface on the display device 408 of the computing device. The computing device 404 communicates the user inputs 422 to the data service 402 via the network 410, where the scatter plot application 420 receives the user inputs. The scatter plot application 420 can also receive other user inputs 422 to initiate displaying and interacting with the data points 106 in a scatter plot 108.

For example, as described with reference to FIG. 1, when a user selects the "play" selectable control 124 to initiate an animation of the data points 106 in the scatter plot 108, the scatter plot application 420 recursively obtains the scatter plot data 418 of sequential (x,y) coordinates for each of the data points, and updates the sequential data for each of the data points effective to animate a progression of the data points in the scatter plot over a time duration. The data service 402 communicates the scatter plot data to the computing device 404 where the scatter plot is displayed in the data visualization interface, such as through the browser application 406 and displayed on the display device 408 of the computing device.

The scatter plot application 420 can also receive additional user inputs 422, such as a user selection of data points 106 that are displayed in a scatter plot 108, and the scatter plot application initiates a display update to change a visual representation of the selected data points. The scatter plot application may also receive a user selection to update a data variable (e.g., of the scatter plot data 418) for selected data points, receive a user selection to tag selected data points for tracking over the time duration of the scatter plot, and/or receive a user selection as a zoom input of the scatter plot to zoom into the selected data points.

Example method 500 is described with reference to FIG. 5 in accordance with one or more embodiments of configurable animated scatter plots. Generally, any of the services, components, modules, methods, and operations described herein can be implemented using software, firmware, hardware (e.g., fixed logic circuitry), manual processing, or any combination thereof. The example methods may be described in the general context of executable instructions stored on a computer-readable storage memory that is local and/or remote to a computer processing system, and implementations can include software applications, programs, functions, and the like.

Figure 5:
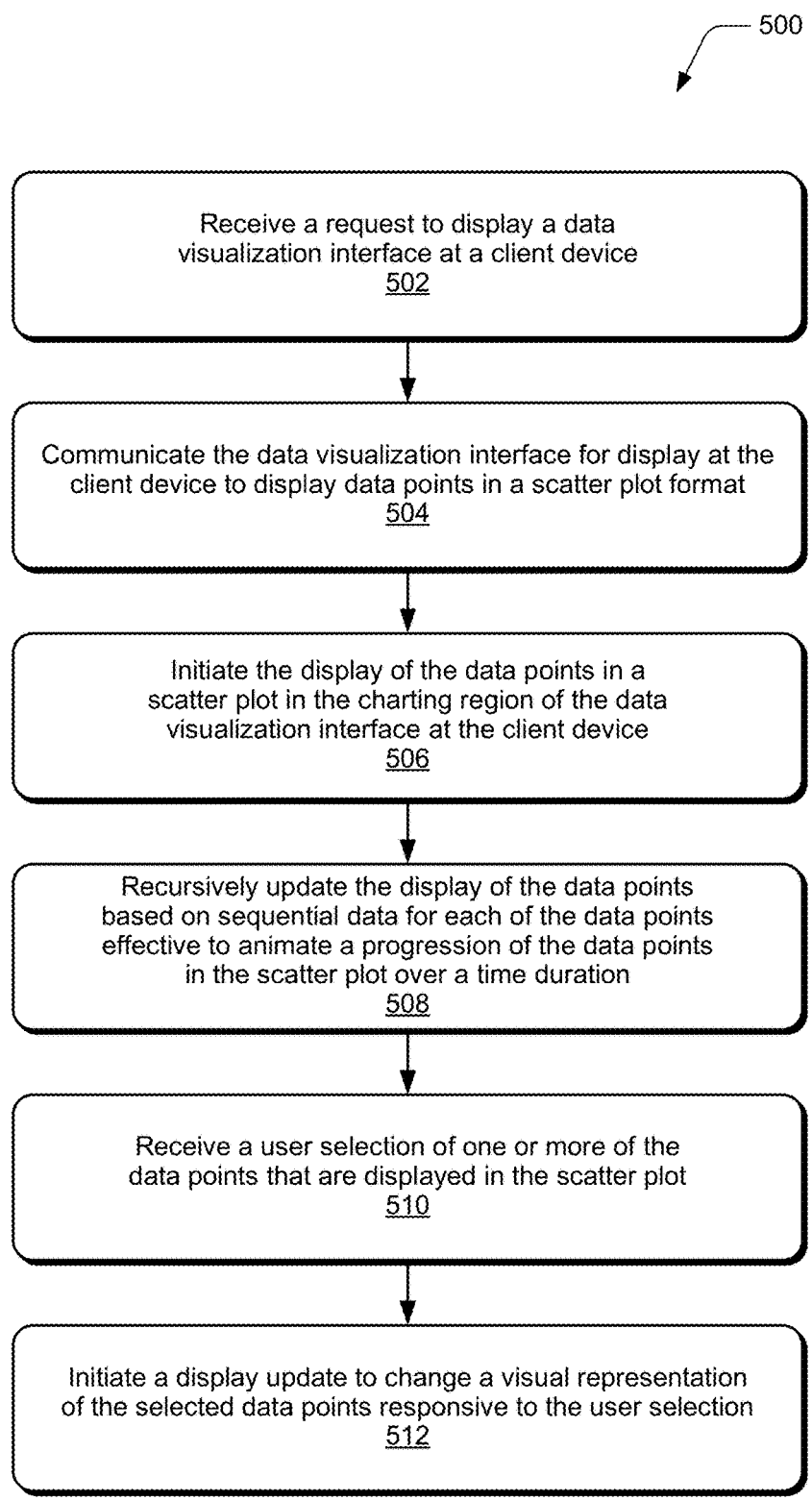
FIG. 5 illustrates example method(s) of configurable animated scatter plots in accordance with one or more embodiments.

FIG. 5 illustrates example method(s) 500 of configurable animated scatter plots, and is generally described with reference to a scatter plot application implemented by a server device at a data service. The order in which the method is described is not intended to be construed as a limitation, and any number or combination of the method operations can be combined in any order to implement a method, or an alternate method.

At 502, a request is received to display a data visualization interface at a client device. For example, the scatter plot application 420 (FIG. 4) implemented at the cloud-based data service 402 receives a request from the computing device 404, such as via the browser application 406, to display the data visualization interface 102 on the display device 408. The data visualization interface 102 includes the charting region 104 to display the data points 106 in a scatter plot format.

At 504, the data visualization interface is communicated for display at the client device to display the data points in a scatter plot format. For example, a data server 412 implemented at the data service 402 communicates the data visualization interface 102 for display at the computing device 404, such as when a user of the computing device logs into the data service and via the browser application 406, initiates a request to view a scatter plot 108 in the data visualization interface At 506, a display is initiated of the data points in a scatter plot in the charting region of the data visualization interface at the client device. For example, the scatter plot application 420 implemented at the data service 402 initiates displaying the data points 106 in the scatter plot 108 in the data visualization interface at the computing device 404, where each of the data points represent values for two variables that are correlated by the scatter plot, and the respective position of a data point in the scatter plot illustrates the correlation of the two variables at a particular time within the time duration 110 over which the scatter plot is animated and displayed.

At 508, the display of the data points is recursively updated based on sequential data for each of the data points effective to animate a progression of the data points in the scatter plot over a time duration. For example, the scatter plot application 420 implemented at the data service 402 recursively updates the scatter plot 108 based on sequential scatter plot data 418 for each of the data points 106 effective to animate a progression of the data points in the scatter plot over the time duration 110 of the scatter plot. The scatter plot application 420 recursively obtains the scatter plot data 418 of sequential (x,y) coordinates for each of the data points, and updates the sequential data for each of the data points effective to animate a progression of the data points in the scatter plot.

At 510, a user selection is received of one or more of the data points that are displayed in the scatter plot. For example, the scatter plot application 420 implemented at the data service 402 receives user selections of one or more of the data points 106 in the scatter plot 108, such as to tag the selected data points for tracking over the time duration of the scatter plot. The scatter plot application also receives user inputs to update data variables (e.g., of the scatter plot data 418) for selected data points, and can receive a user selection as a zoom input of the scatter plot to zoom into the selected data points.

At 512, a display update is initiated to change a visual representation of the selected data points responsive to the user selection. For example, the scatter plot application 420 implemented at the data service 402 initiates a display update to change a visual representation of selected data points 106 in the scatter plot 108, such as responsive to a user input to update the data variables for selected data points. The data service 402 communicates the scatter plot data 418 to the computing device 404 for display in the data visualization interface 102, where the data is displayed in the scatter plot.

Figure 6:
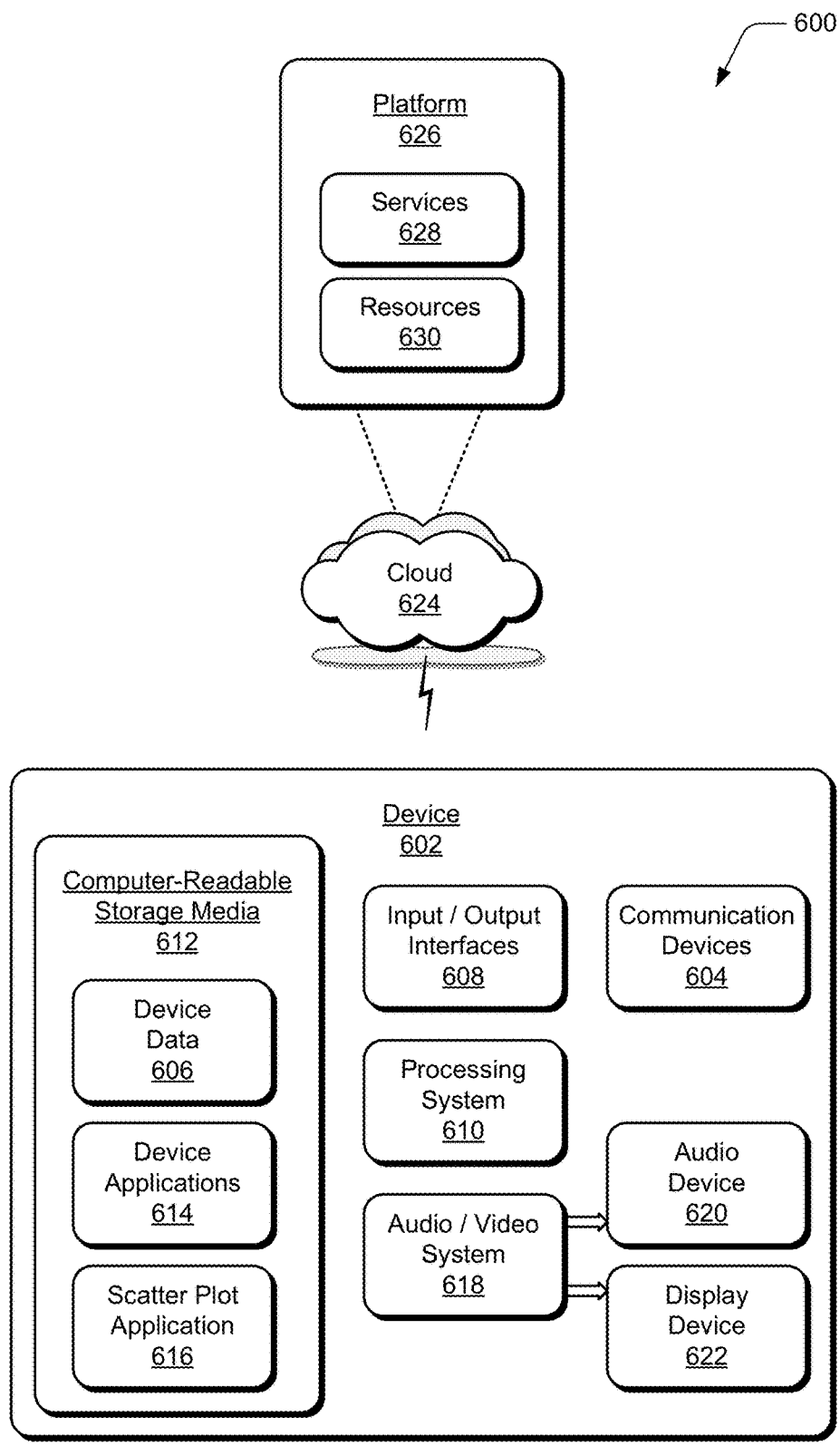
FIG. 6 illustrates an example system with an example device that can implement embodiments of configurable animated scatter plots.

FIG. 6 illustrates an example system 600 that includes an example device 602, which can implement embodiments of configurable animated scatter plots. The example device 602 can be implemented as any of the devices and/or server devices described with reference to the previous FIGS. 1-5, such as any type of client device, mobile phone, tablet, computing, communication, entertainment, gaming, media playback, and/or other type of device. For example, the computing device 404 and the data service 402, as well as any devices and data servers of the data service, shown in FIG. 4 may be implemented as the example device 602.

The device 602 includes communication devices 604 that enable wired and/or wireless communication of device data 606, such as the trending data, scatter plot data, and updates to the data. The device data can include any type of audio, video, and/or image data, as well as the trending data and the scatter plot data. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device that may be integrated with device 602. The I/O interfaces also include data input ports via which any type of data, media content, and/or inputs can be received, such as user inputs to the device, as well as any type of audio, video, and/or image data received from any content and/or data source.

The device 602 includes a processing system 610 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The device 602 also includes computer-readable storage media 612, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 612 provides storage of the device data 606 and various device applications 614, such as an operating system that is maintained as a software application with the computer-readable storage media and executed by the processing system 610. In this example, the device applications also include a scatter plot application 616 that implements embodiments of configurable animated scatter plots, such as when the example device 602 is implemented as the data service 402 shown in FIG. 4. An example of the scatter plot application 616 includes the scatter plot application 420 implemented at the data service 402, as described with reference to FIG. 4.

The device 602 also includes an audio and/or video system 618 that generates audio data for an audio device 620 and/or generates display data for a display device 622. The audio device and/or the display device include any devices that process, display, and/or otherwise render audio, video, display, and/or image data, such as the image content of a digital photo. In implementations, the audio device and/or the display device are integrated components of the example device 602. Alternatively, the audio device and/or the display device are external, peripheral components to the example device.

In embodiments, at least part of the techniques described for configurable animated scatter plots may be implemented in a distributed system, such as over a "cloud" 624 in a platform 626. The cloud 624 includes and/or is representative of the platform 626 for services 628 and/or resources 630. For example, the services 628 may include the data service 402 as described with reference to FIG. 4. Additionally, the resources 630 may include the scatter plot application 420 that is implemented at the data service as described with reference to FIG. 4.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although embodiments of configurable animated scatter plots have been described in language specific to features and/or methods, the appended claims are not necessarily limited to the specific features or methods described. Rather, the specific features and methods are disclosed as example implementations of configurable animated scatter plots.

The invention claimed is:

1. An interactive data visualization system configured to animate how variables that correlate to data points in scatter plots change over time, the interactive data visualization system comprising:
    a database configured to store sequential data for data points;
    a data visualization interface that includes a charting region configured to display the data points in a scatter plot format;
    a processing system of a server device to implement a scatter plot application that is configured to:
        receive a request to display the data visualization interface at a client device;
        initiate a display on a display device associated with the client device of the data points in a scatter plot in the charting region of the data visualization interface at the client device, the data points displayed in the scatter plot each representing two values corresponding to two respective variables that are correlated by the scatter plot, and the data points each further representing the two values for the two respective variables at a particular time within a time duration over which the sequential data spans; and
        recursively update the display of the data points according to the sequential data at other times within the time duration for each of the data points effective to animate a progression of the data points in the scatter plot over the time duration.

2. The interactive data visualization system as recited in claim 1, wherein to said recursively update the display of the data points, the scatter plot application is configured to recursively, over the time duration, obtain next sequential data for each of the data points and initiate the display of each of the data points in the scatter plot at a respective position based on the next sequential data.

3. The interactive data visualization system as recited in claim 2, wherein the sequential data for each of the data points includes a list of (x,y) coordinates, and each (x,y) coordinate identifies the respective position of a data point in the scatter plot at a particular time within the time duration.

4. The interactive data visualization system as recited in claim 3, wherein the respective position of a data point in the scatter plot illustrates a correlation of the two variables at the particular time within the time duration.

5. The interactive data visualization system as recited in claim 1, wherein the scatter plot application is configured to:
    receive a user selection of one or more of the data points that are displayed in the scatter plot; and
    responsive to the user selection, initiate a display update to change a visual representation of the one or more selected data points.

6. The interactive data visualization system as recited in claim 5, wherein the user selection is received to tag the one or more selected data points for tracking over the time duration.

7. The interactive data visualization system as recited in claim 5, wherein the user selection is received as a zoom input of the scatter plot to zoom the display of the one or more selected data points.

8. The interactive data visualization system as recited in claim 5, wherein the user selection is received to update a data variable of the one or more selected data points.

9. A method for indicating how variables that correlate to data points in scatter plots change over time, the method comprising:
    communicating a data visualization interface for display at a client device, the data visualization interface including a charting region configured to display data points in a scatter plot format;
    initiating a display of one of a plurality of sequential frames on a display device associated with the client device of the data points, each of the frames displayed in a scatter plot in the charting region of the data visualization interface at the client device and corresponding to a different time, within a time duration over which sequential data for the data points spans, than other frames of the plurality of sequential frames, the data points displayed by the one sequential frame representing values, at a particular one of the different times, for two variables that are correlated by the scatter plot; and
    recursively updating the display by displaying a different one of the plurality of sequential frames effective to animate a progression of the data points in the scatter plot over the time duration.

10. The method as recited in claim 9, wherein said recursively updating the display further comprises:
   obtaining next sequential data for each of the data points; and
   said initiating the display of each of the data points in a next one of the plurality of sequential frames at a respective position based on the next sequential data.

11. The method as recited in claim 10, wherein the sequential data for each of the data points is a list of (x,y) coordinates, and each (x,y) coordinate identifies the respective position of a data point in a corresponding sequential frame at a corresponding time.

12. The method as recited in claim 11, wherein the respective position of a data point in the corresponding sequential frame illustrates the correlation of the two variables at the corresponding time.

13. The method as recited in claim 9, further comprising:
   receiving a user selection of one or more of the data points that are displayed in the scatter plot; and
   responsive to the user selection, initiating a display update to change a visual representation of the one or more selected data points.

14. The method as recited in claim 13, wherein the user selection is received to tag the one or more selected data points for tracking over the time duration.

15. The method as recited in claim 13, wherein the user selection is received as a zoom input of the scatter plot to zoom the display of the one or more selected data points.

16. The method as recited in claim 13, wherein the user selection is received to update a data variable of the one or more selected data points.

17. A system to indicate how variables that correlate to data points in scatter plots change over time, the system comprising:
   one or more processors; and
   memory comprising computer-readable instructions that are executable to implement a scatter plot application configured to perform operations comprising:
      receiving a request to display a data visualization interface at a client device, the data visualization interface including a charting region configured to display data points in a scatter plot format;
      initiating a display on a display device associated with the client device of the data points in a scatter plot in the charting region of the data visualization interface at the client device, the data points displayed in the scatter plot representing values, at a particular time within a time duration over which sequential data for the data points spans, for two variables that are correlated by the scatter plot, and the data points displayed corresponding to one of a plurality of sequential frames, each of the frames representing a different time over the time duration; and
      recursively updating the display of the data points by displaying a next frame of the plurality of sequential frames effective to animate a progression of the data points in the scatter plot over the time duration.

18. A system as recited in claim 17, wherein the operations further comprise recursively, over the time duration, obtaining next sequential data for each of the data points and said initiating the display of each of the data points in the scatter plot at a respective position based on the next sequential data.

19. A system as recited in claim 17, wherein:
   the sequential data for each of the data points includes a list of (x,y) coordinates, and each (x,y) coordinate identifies the respective position of a data point in the scatter plot at a particular time within the time duration.

20. A system as recited in claim 17, wherein the operations of the scatter plot application further comprise:
   receiving a user selection of one or more of the data points that are displayed in the scatter plot; and
   responsive to the user selection, initiating a display update to change a visual representation of the one or more selected data points.

\* \* \* \* \*